Figure 1:
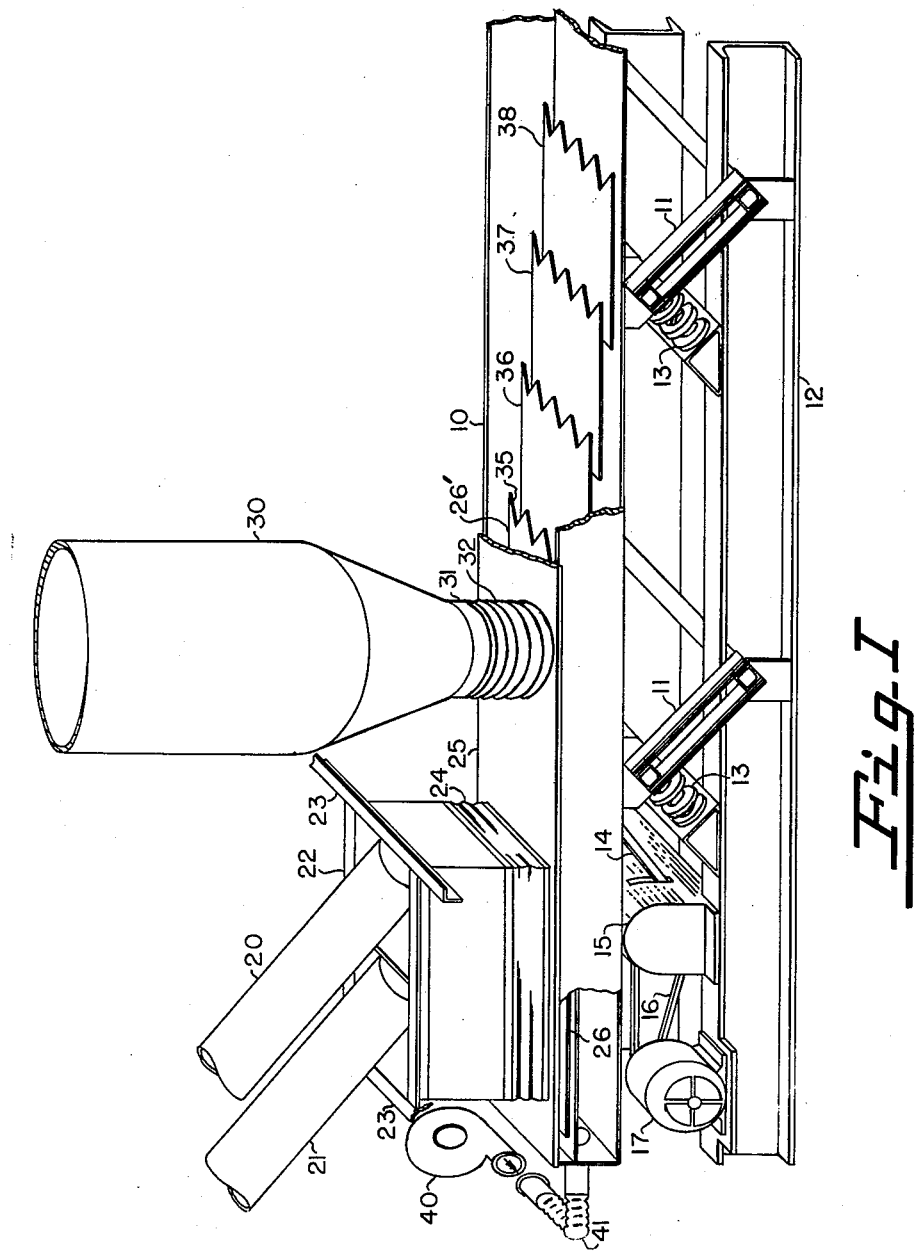

April 2, 1963

G. W. GLASS 3,083,411

METHOD FOR SEEDING FINES

Filed Oct. 7, 1958

2 Sheets-Sheet 1

INVENTOR.
GILBERT W. GLASS
BY
Marshall, Marshall & Yeasting
ATTORNEYS

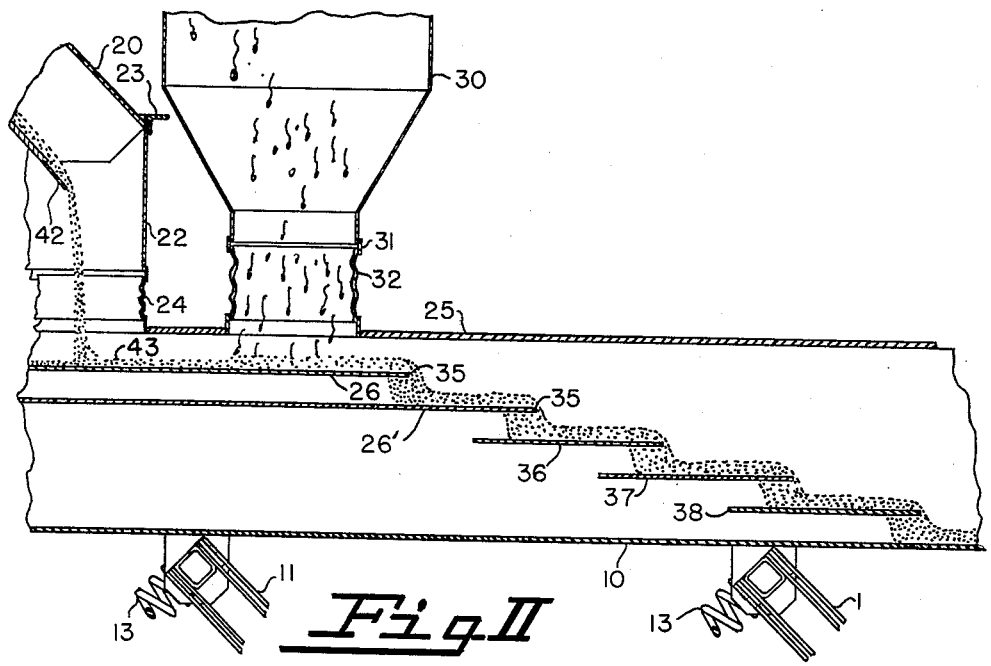
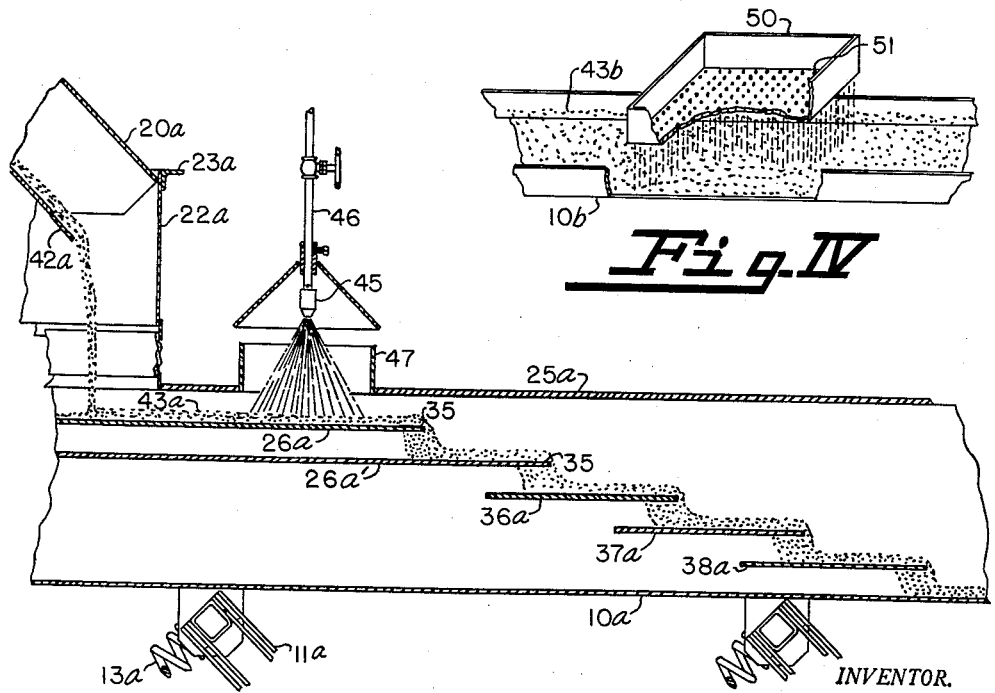

3,083,411
METHOD FOR SEEDING FINES
Gilbert W. Glass, Newark, N.J., assignor, by mesne assignments, to Chain Belt Company, Milwaukee, Wis., a corporation of Wisconsin
Filed Oct. 7, 1958, Ser. No. 765,827
9 Claims. (Cl. 18—48)

This invention relates to a method for handling and mixing various types of materials some of which are tacky or in liquid form and tend to accumulate on surfaces with which they come in contact.

In many manufacturing processes it is necessary to handle materials that are in a sticky, tacky or gummy condition and combine them with other materials. The tacky or gummy materials are difficult to handle because they tend to foul any equipment which they contact and thus the equipment requires frequent cleaning to keep it in operating condition. It is also necessary in many processes that the material which may be sticky or gummy in one stage of the processing be converted to a dry nonsticky porous granular condition for storing, handling, or further processing.

The principal object of this invention is to provide a method for combining tacky or gummy products with similar or different products in a dry state to provide both mixing and agglomeration of the products and non-fouling of the equipment.

Another object of the invention is to provide a method for forming a porous granular product from a finely divided material and a gummy or tacky material.

A still further object of the invention is to provide a method for forming a material into a porous granular state by adding a material in a tacky or gummy state to an agitated bed of material in a finely divided dry state.

A still further object of the invention is to provide a process for mixing a product in a tacky or gummy state with a similar or dissimilar product in a fine dry state to form porous granules of the composite material.

A still further object is to provide a method for forming a fine dry powdery material into a coarse porous granular material or state.

More specific objects and advantages are apparent from the following description of the invention.

According to the invention a product in a porous coarse granular state is formed from materials one of which is in a freely conveyable finely divided state and the other of which is in a liquid or is in a more or less finely divided but gummy or tacky state by the steps of forming an agitated bed of the conveyable portion of the material and sprinkling the liquid or the tacky or gummy component into such agitated bed whereby each increment of the tacky material adds to itself enough of a dry powdery material to form a coarse granule having non-tacky surface characteristics. The continuous agitation of the bed of material during the process is an important factor in controlling the size of the granules and their porosity.

Preferred forms of apparatus for carrying out the improved method are illustrated in the accompanying drawings.

In the drawings:

FIG. I is a generally perspective view of a vibratory conveyor arranged to carry out the improved process.

FIG. II is a longitudinal vertical section of the conveyor illustrated in FIG. I to indicate the internal portions of the conveyor.

FIG. III is a similar longitudinal section of a conveyor showing a different method of introducing one of the materials.

FIG. IV is a fragmentary view of still another form of apparatus for introducing one of the materials into the process.

These specific figures and the accompanying description are intended merely to illustrate the invention and not to impose limitations on its scope.

Apparatus for carrying out the invention comprises a vibratory conveyor trough 10 that is guided for vibration along an inclined path by a plurality of guide springs 11 spaced at intervals along its length and connected between the trough 10 and a base 12. The trough 10 is supported for vibration along the inclined path by a plurality of coil springs 13, extending between the trough 10 and the base 12, that form with the trough a vibratory system having a natural frequency substantially at the operating frequency of the conveyor.

Vibratory motion of the conveyor trough 10 is produced by way of a connecting rod 14 and eccentric drive mechanism 15 that is driven by a belt 16 from a drive motor 17. The eccentric mechanism 15 and motor 17 are mounted on the base 12.

The readily conveyable components of the material to be processed are supplied through chutes 20 and 21, two being shown although more may be included if more materials are to be mixed. The chutes 20 and 21 discharge through a surge bin or bins 22 supported on rails 23 independently of the conveyor. The bin 22 discharges through a flexible sock or curtain 24 and a hole in a top cover 25 of the conveyor trough 10 onto a shelf 26 in the trough 10. Means, not shown, included in the bin 22 near its bottom or in the conveyor trough 10 above the shelf 26 distribute the material laterally of the conveyor to form a substantially uniform bed of material. The vibratory motion of the conveyor trough 10 moves the material to the right as shown in FIG. I.

As the bed of fine granular or powdery material moves to the right along the shelf 26 it passes beneath a lower end of a spray drying tower 30 the lower end 31 of which is connected through a flexible sock 32 to the cover plate 25 of the conveyor trough 10. The opening in the cover plate 25 under the tower 30 extends substantially all the way across the cover plate. The product handled in the spray drying tower 30, which is to be combined with the material supplied through the chutes 20 or 21, is allowed while still in a tacky or gummy condition, to drop through the flexible sock 32 onto the bed of material on the shelf 26. The falling particles of material from the tower 30 are thus sprinkled across the bed of material without being allowed to coalesce or agglomerate among themselves into larger coarse granules. As these tacky or gummy particles fall into the agitated bed of dry material they give up part of their moisture to the dry material and at the same time tend to agglomerate the material into small chunks or granules. The size of such granules depends upon the size of the tacky or gummy particles falling into the bed of material, the amount of moisture they contain, their temperature, and the readiness with which they give up moisture to the surrounding material.

The bed of dry material, after passing beneath the spray drying tower 30 and having the product of the tower sprinkled thereon, passes or cascades over a serrated edge 35 of the shelf 26 onto a second shelf 26′ and thence over a series of three or more short shelves 36, 37 and 38 each of which has a serrated edge to enhance the mixing of the material as it cascades from one shelf to the next. The combination of the agitation resulting from the vibratory conveying action and the cascading from step to step exposes all surfaces of the tacky material to the dry granular or powdery material to promote agglomeration of the materials. At the same time the agitation dislodges from the larger granules any insecurely held powdery material so that the resulting granules are quite firm in structure and of substantially uniform size.

Any conditioning of the materials such as heating, cooling or drying may be carried out as the material is cascading from step to step by blowing a conditioning fluid from a fan 40 through a flexible duct 41 into the conveyor trough 10 beneath the shelf 26 and allowing it to escape through the open spaces between the overlapping shelves 26, 36, 37 and 38.

The path of the materials through the vibratory conveyor is illustrated in somewhat greater detail in FIG. II in which it may be noted that the incoming dry or powdery materials fed through the chutes 20 or 21 drop through the surge bin 22 and are spread by a lip 42 so as to fall uniformly across the width of the conveyor. The rate of supply of this material in comparison with the rate of feed of the vibratory conveyor in such that the material accumulates as a bed 43 of substantial thickness as it passes beneath the spray tower 30. The tacky material falling from the tower 30 is thus caught solely on the bed of material and not allowed to contact the sides of the conveyor where it might tend to adhere and build up undesirable deposits. As it falls or is sprinkled over the area of the bed of material 43 the tacky material collects the dry powdery material into little chunks surrounding each particle of tacky material and these tend to grow according to the characteristics of the material as they are thoroughly mixed by passing from the shelf 26 onto the succeeding shelves towards the discharge end of the conveyor.

FIG. III illustrates still another form of the invention in which the conveyable material is supplied through a chute 20a and surge bin 22a to form a bed 43a on a shelf 26a of a vibratory conveyor trough 10a. In this embodiment the second material is supplied through a spray gun or a spray nozzle 45 from a supply line 46 arranged to spray through an opening 47 in the deck 25a of the conveyor trough 10a so as to sprinkle the incoming liquid or viscous material uniformly across the width of the bed of material 43a on the shelf 26a.

The liquid being sprayed or sprinkled onto the bed of material 43a may be at normal or at elevated temperatures depending upon its handling characteristics. For example, some materials which are solid at normal temperatures may be melted at an elevated temperature and caused to flow as a liquid at such temperatures and thus be evenly divided and distributed across the bed of material. In this embodiment as in the previous embodiment the tacky or gummy material, which may be either solid particles, or semi-solid particles, or a liquid is not allowed to contact, in appreciable quantities, the sides of the conveyor or the wall surrounding the opening in the cover 25 or 25a thus minimizing the cleaning required to keep the equipment in operating order.

FIG. IV illustrates still another form of equipment for adding the second component, i.e. the tacky or the gummy component of material. In this embodiment a drip box or a similar container 50 is mounted either on the top of the conveyor trough 10a or independently therefrom in position to discharge liquid or viscous material through small holes 51 in its bottom so that the drops exuding through such holes or the streams of material through the holes is evenly distributed across the bed of material 43b flowing in the subjacent conveyor trough 10b. If the tacky or gummy material being added is quite viscous, like molasses, it may be desirable to mount the box 50 directly on the conveyor trough 10a so that the vibratory motion of the box tends to break up the streams of material exuding through the holes 51 and cause the exuded material to fall as discrete drops into the bed of dry material. The sizes of the drops and the size of the resulting granules is controlled by the size of the openings. Further control may be effected by closing the top of the box and applying air pressure or partial vacuum over the material to increase or decrease the flow rate.

The various forms of apparatus illustrated in the drawings provide an economical, efficient sytem for mixing a dry granular or powdery material, which is an easily conveyable material, with a second material which is difficult to handle and which may be either fluid, solid or semi-solid separated particles with a tacky or gummy surface. In the event the second material is fluid it may be either at normal or elevated temperature depending upon which temperature provides the easier dispersion and sprinkling of the fluid across the area of the bed of dry material on the conveyor. The fluid may be either sprayed from nozzles to effect a fine dispersion and, or, if larger granules are desired in the final product, it may be added in the form of large drops formed by passing the material through a sprinkler screen or drip box such as the orifices 51 in the bottom of the box 50. Likewise the second material may be a tacky or a gummy product from a spray tower which is an example of a solid or a semi-solid material in discrete particles each of which when dropped into the bed of dry material acts as a seed or nucleus in the formation of a larger granule composed of the initial tacky material and the dry powdery material.

As one example of a use of the equipment, dry powdery ammonium nitrate was fed through the ducts 20 to form a bed of material on the shelf 26 of the vibratory conveyor and then molten ammonium nitrate was sprinkled through a sprinkling member corresponding to the box 50 in which the orifices were a little larger than a tenth of an inch in diameter. The drops of molten material falling from the orifices into the dry ammonium nitrate on the conveyor immediately picked up quantities of the dry material to form large porous particles that would maintain their shapes during the subsequent mixing. The resultant particles could be easily handled without further agglomeration into unuseable chunks of material or breaking down into fine dusty material.

As a second example using equipment similar to that illustrated in FIGS. I and II, dry powdery components of a detergent were fed through the chutes 20 and 21 and mixed by the vibratory action of the conveyor as they left the area beneath the surge bin 22. This powdery bed of material then passed beneath a spray tower where hot tacky particles of partially dried material from the tower were sprinkled across the bed of material. The amount of material from the spray tower was enough to provide a good coverage of the bed of material without being enough for individual tacky particles to often contact each other rather than the dry material in the bed. In this case the tacky material from the tower readily combined with the dry material to give up some of its moisture and heat to the dry material to form large porous particles that are readily soluble in use.

When the tacky material is quite warm or hot or is still in the final stages of an exothermic chemical reaction the cooling requirements with this type of apparatus are quite nominal because the tacky hot material gives up most of its heat directly to the dry bed of material to form the larger particles or granules of product material. This is particularly true when a moist tacky material from a spray tower or a liquid at elevated temperature gives up its heat of solidification to the dry material in forming the granules of composite material.

The process and apparatus described make it possible to convert an exeremely dry powdery material to a porous granular state suitable for further processing or use.

Various modifications may be made in the details of construction of the equipment and manner of feeding the various components of material to the conveyor without losing the advantages obtained by first forming a bed of conveyable material and sprinkling or showering into such bed the particles or discrete drops of a second tacky or adherent material.

Having described the invention, I claim:

1. A method of combining into a composite granular state at least one component of material in a dry finely divided state and at least one other component that is in a tacky particle state sufficiently adhesive to bond together particles of the dry material comprising the steps of conveying the dry material on a vibratory conveyor to form an agitated bed of material, sprinkling the tacky particle material onto the agitated bed of dry material, and continuing the agitation to promote mixing and agglomeration of the dry and tacky material until the exteriors of the resulting granules lose their adhesive character.

2. A method of combining into a composite granular state at least one component of material in a finely divided generally free-flowing state and at least one other component that is in a tacky particles state sufficiently adhesive to bond together particles of the free-flowing material comprising the steps of spreading the free-flowing component of material on a deck, vibrating the deck to agitate the material, sprinkling the tacky component onto the material on the deck and cascading the material over a series of steps attached to the deck while continuing the vibration of the deck and steps until the resulting granules lose their adhesive character.

3. A method of combining into a composite granular state at least one component of material in a finely divided generally free-flowing state and at least one other component having a tacky characteristic sufficiently adhesive to bond together particles of the free-flowing material comprising the steps of spreading the finely divided material on a deck, vibrating the deck to agitate and convey the material, sprinkling the tacky component onto the material on the deck and continuing the vibration to promote the agglomeration of the material until each resulting granule loses its adhesive character and is conveyed from the deck.

4. A method of agglomerating a powdery material into a porous granular form, comprising vibratorily conveying the powdery material as a bed of substantial depth, providing additional material in a tacky state, adding the additional material in discrete increments to the bed of material in amounts such that each increment accumulates a portion of the powdery material and loses its tacky state, and continuously vibrating said bed of material to minimize the agglomeration of the increments of tacky material.

5. A method of agglomerating a powdery material into a porous granular state, comprising the steps of vibratorily conveying the powdery material in a bed of substantial depth, providing an additional quantity of the material in the form of discrete tacky increments, sprinkling said tacky increments into the vibrating bed of powdery material, and continuing the vibration at least until each tacky increment acquires sufficient powdery material to lose its tacky state.

6. A method of agglomerating a material in a finely divided state that comprises the steps of spreading the finely divided material on a surface, vibrating the surface to agitate and convey the finely divided material, providing an additional quantity of the material in the form of discrete tacky particles, sprinkling the tacky particles onto the finely divided material, and continuing the vibratory conveying to mix the materials and promote agglomeration of the finely divided material with the individual particles.

7. A method of producing a coarse granular product from a finely divided material comprising the steps of spreading the fine material as a generally uniform bed, vibratorily conveying the bed of fine material, providing a portion of the material in the form of discrete tacky particles, sprinkling the particles onto the vibrating bed of fine material, and continuing the vibratory conveying to mix the particles and fine material at least until the particles each acquires sufficient fine material to lose its tacky state.

8. A method of producing a coarse granular product from a finely divided material comprising the steps of spreading the fine material as a generally uniform bed, vibratorily conveying the bed to agitate the material, providing another portion of the material in a molten tacky form, sprinkling drops of the molten material into the bed of fine material, and continuing the vibratory conveying of the bed to mix the drops and fine material as each drop gathers a coating of fine material and loses its tacky state.

9. A method of producing a coarse granular product from a finely divided material comprising the steps of spreading the fine material as a generally uniform bed, vibratorily conveying the bed to agitate the material, providing another portion of the material in the form of tacky partially dried particles, sprinkling the partially dried particles onto the bed of material, and continuing the vibratory conveying of the bed to mix the fine material and particles as the fine material agglomerates with the individual partially dried particles.

References Cited in the file of this patent

UNITED STATES PATENTS

| 657,393 | Buss | Sept. 4, 1900 |
| 2,118,526 | Robinson | May 24, 1938 |
| 2,324,874 | Peters | July 20, 1943 |
| 2,498,405 | Fader | Feb. 21, 1950 |
| 2,563,475 | Mahoney | Aug. 7, 1951 |
| 2,627,457 | Kerley | Feb. 3, 1953 |
| 2,726,852 | Sommer | Dec. 13, 1955 |
| 2,793,139 | Grunewald | May 21, 1957 |
| 2,824,022 | Sucetti | Feb. 18, 1958 |
| 2,938,233 | Nack et al. | May 31, 1960 |

FOREIGN PATENTS

| 547,259 | Belgium | Oct. 23, 1956 |